Patented Mar. 24, 1942

2,277,629

UNITED STATES PATENT OFFICE 2,277,629

COLORING MATTERS OF THE PHTHALOCYANINE SERIES

Eric Flower Bradbrook, Manchester, Isidor Morris Heilbron and Donald Holroyde Hey, London, and John Wynne Haworth, Manchester, England, assignors to Imperial Chemical Industries Limited, a corporation of Great Britain No Drawing. Application November 29, 1939, Serial No. 306,772. In Great Britain November 28, 1938

11 Claims. (Cl. 260—314)

An object of the present invention is to provide new phthalocyanines. A further object is to provide a process for the manufacture of such new phthalocyanines. A still further object is to provide new compositions of matter. Other objects will appear hereinafter.

It is well known that phthalocyanines are obtained by heating ortho-dinitriles of the benzene or naphthalene series with reagents capable of providing either two atoms by hydrogen or one or two atoms of a metal. That is, the reaction may be illustrated, in the form of equations, as follows:

(I) $4C_6H_4(CN)_2 + H_2$ (from any suitable source) $= C_{32}H_{16}N_8H_2$ (where is shown the production of the so-called metal-free phthalocyanine from phthalic dinitrile).

(II) $4C_6H_4(CN)_2 + Cu = C_{32}H_{16}N_8Cu$ (where is shown the production of copper phthalocyanine from phthalic dinitrile and metallic copper).

The heating of the ortho-dinitrile of the benzene or naphthalene series may be with a metal or a metal compound. When alkali metals, for example, in the form of their alcoholates are used, the final products obtained after hydrolysis are free from metals. Products free from metals are also obtained when the ortho-dinitriles are heated with hydroxy compounds. For example, triethanolamine, or acid amides, e. g. formamide, and if desired the heating may be carried out in presence of a metal or metal compound.

It is also known that phthalocyanines can be made in a one-step process from such compounds as are converted into ortho-dinitriles of the benzene or naphthalene series in the course of the reaction. Thus, for example, the corresponding dihalogen compounds may be heated with cuprous cyanide; or ortho-halogeno-nitriles or ortho-cyanocarboxylic amides may be used as starting materials; or the corresponding dicarboxylic acids, their anhydrides, imides or other derivatives may be similarly used, the necessary nitrogen being provided by the decomposition of urea, or by carrying out the heating in the presence of ammonia.

By the present invention new phthalocyanines are made by bringing into reaction certain substituted phthalic dinitriles, namely, those containing a pyridyl radical. There are thus obtained products which combine with acids to form salts. Some of these salts dissolve readily in water, and the aqueous solutions so obtained dye cellulose directly.

According to the present invention pyridylphthalic dinitriles are caused to interact under the influence of heat with substances capable of yielding metal or hydrogen atoms. Compounds capable of yielding hydrogen atoms are aliphatic or aromatic hydroxy compounds and aliphatic or aromatic carboxylic or sulphonic amides.

There may also be used according to the present invention pyridylphthalic acids, pyridylphthalimides and ortho-dihalogenophenylpyridines for example. Thus a pyridylphthalic acid may be caused to interact with urea and a metal-yielding substance. A pyridylphthalimide may also be caused to interact with urea and a metal-yielding substance. Further in working according to this invention there may be employed an ortho-dihalogenophenylpyridine in conjunction with, for example, cuprous cyanide.

It is advantageous for control of the reaction to cause it to take place in presence of a solvent or solid or liquid diluent. The reaction may be carried out under super-atmospheric pressure.

The new compounds are green. They dissolve in concentrated sulphuric or hydrochloric acid to give solutions which when poured into water give green precipitates which may or may not contain chemically combined metal. They dissolve in aqueous solutions of sulphamic acid.

By a further feature of the invention dry compositions suitable for dissolving in water for preparing dye-baths or for other coloring purposes are made by mixing together in the dry state the new phthalocyanines and a suitable proportion of sulphamic acid.

The invention is illustrated but not limited by the following examples in which the parts are by weight.

Example 1

20.5 parts of 4-pyridylphthalonitrile (see U. S. Patent No. 2,211,947) and 5 parts of cuprous chloride are mixed with 150 parts of 1-chloronaphthalene. The mixture is stirred and heated up to 220–230° C. It becomes green already at 170–180° C. After 2½ hours the mixture is cooled and filtered. The green insoluble material is washed with benzene and dried.

The dark green powder so obtained, which presumably is copper-tetra-4-pyridyl-phthalocyanine of the formula

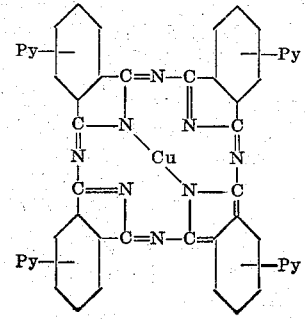

wherein the Py's designate pyridyl radicals, gives a bright green solution in hot quinoline. It dissolves in aqueous hydrochloric acid (sp. gr. 1.18) to give a green solution, and in concentrated sulphuric acid to give a yellowish brown solution. When these solutions are poured into water the green phthalocyanine is precipitated in finely divided form. It is then filtered off and dried.

The 4-pyridylphthalonitrile above mentioned may be prepared as follows:

108 parts of 4-aminophthalonitrile (obtained by reducing 4-nitrophthalonitrile) are dissolved in 400 parts of water and 472 parts of aqueous hydrochloric acid, sp. gr. 1.18. The solution is cooled to about 5° C. and 52 parts of sodium nitrite dissolved in 400 parts of water are slowly added.

The aqueous solution of diazo compound thus obtained is run slowly into 800 parts of pyridine which is kept at 30 to 35° C. and is well stirred. Nitrogen is evolved and a pale brown finely divided solid is precipitated. When no more gas is given off the precipitate is filtered off, washed with water and dried. This substance may be purified when necessary by dissolving it in a sufficiency of benzene, and adding petroleum spirit (B. P. 40 to 60° C.) to the solution to reprecipitate it.

The substance so obtained consists of a mixture of pyridyl phthalonitriles and can be represented by the formula $C_5H_4N-C_6H_3(CN)_2$, the linkage with the pyridyl group being in the alpha-, beta- or gamma-position in the pyridine ring.

Example 2

10.3 parts of 4-pyridylphthalic dinitrile and 0.6 part of magnesium borings are heated together with stirring. At 210-220° C. the mixture becomes green. The temperature is kept at 290-300° C. for 2 hours. The mixture becomes stiff and intensely green in color. It is cooled, crushed, sifted from excess of magnesium, washed with hot ethyl alcohol, and dried.

There is thus obtained a green powder showing a purple sheen. The substance is soluble in pyridine, quinoline and chloronaphthalene. The substance contains magnesium in chemical combination. It dissolves in hydrochloric acid (sp. gr. 1.18), concentrated sulphuric acid or fuming sulphuric acid (10% $SO_3$) to give yellowish brown solutions. When these solutions are poured into water, a bright green precipitate is formed. When this is filtered off, washed with water and dried the product obtained is found to contain no magnesium, and hence is to be described as a metal-free phthalocyanine.

Example 3

10.3 parts of 4-pyridylphthalic dinitrile and 5.6 parts of litharge are stirred and heated together. The fluid mass tends to solidify at 200-210° C. as an exothermic reaction takes place. The mass is cooled, crushed, washed with hot ethyl alcohol and dried. The product, a yellow green powder, with blue sheen, contains lead in chemical combination. It is readily soluble in cold pyridine giving an intense yellow green solution from which solution it is reprecipitated on dilution with water. The product behaves like the magnesium compound described in Example 2, giving the metal-free phthalocyanine on dissolving in sulphuric or hydrochloric acid and precipitating in water as there described. Treatment with glacial acetic acid also removes the combined lead.

Example 4

20 parts of 4-pyridylphthalic dinitrile and 3.4 parts of anhydrous aluminium chloride are stirred and heated together. At 210-220° C. an exothermic reaction, with evolution of hydrogen chloride, takes place. The mass becomes solid. It is cooled, crushed, washed with hot ethyl alcohol and dried.

The so-obtained green powder, which presumably is chloro-aluminum-tetra-pyridyl-phthalocyanine, of the formula

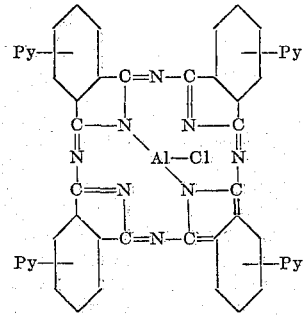

wherein the Py's designate pyridyl radicals, has a purple lustre. It dissolves in sulphuric acid to give a yellowish brown solution. When this solution is poured into water a green precipitate is obtained.

Example 5

35 parts of 4-pyridylphthalimide (see U. S. Patent No. 2,211,947), 105 parts of urea, 7.5 parts of cuprous chloride, and 0.5 part of ammonium molybdate are mixed. The mixture is heated and stirred. A reaction begins at 160-170° C. Heating is continued at 220-230° C. until the green mass becomes almost solid. The mass is cooled, crushed, washed with hot water and hot ethyl alcohol and dried.

There is thus obtained a copper tetra (4-pyridyl) phthalocyanine identical with the product of Example 1.

In place of 4-pyridylphthalimide an equivalent amount of 4-pyridylphthalic acid may be employed with similar results.

Example 6

3 parts of the metal-free phthalocyanine obtained as described in Example 3 and 3 parts of sulphamic acid, both finely pulverised, are mixed together and the mixture is milled until it is uniform. The green powder so obtained dissolves readily in water to give a deep yellowish-green solution.

A dilute aqueous solution so made dyes cotton, and viscose artificial silk, either directly or after mordanting with tannin, to give a bright green shade. The solution may also be used for coloring paper.

Example 7

37.5 parts of 3-pyridylphthalimide, 55 parts of urea, 9.5 parts of cuprous chloride and 0.1 part of ammonium molybdate are heated together with stirring at 210-220° C. for 1½ hours. A dark green mass is obtained which is powdered and extracted with hot dilute aqueous sodium hydroxide solution and then with methylated spirits. A dark green powder is obtained which is soluble in hydrochloric acid (sp. gr. 1.18) and in concentrated sulphuric acid to give yellowish green solutions from which it is reprecipitated by adding water. By this means the product is conveniently purified and converted to a finely divided form, suitable for use as a pigment.

Example 8

90 parts of 4-pyridylphthalimide, 94 parts of urea, 16 parts of cuprous chloride and 0.75 part of ammonium molybdate are mixed and added to 250 parts α-chloronaphthalene. The mixture is heated with stirring at 220–230° C. for 6 hours. After cooling the dark green solid is filtered off and extracted successively with benzene, dilute aqueous sodium hydroxide solution and ethanol. A green soft-textured powder is obtained similar to the product of Example 1.

Example 9

31 parts of 3:4-dibromophenylpyridine (made by reacting diazotised 3:4-dibromoaniline with pyridine), 22 parts of cuprous cyanide, 36 parts of pyridine and 50 parts of nitrobenzene are heated together under a reflux condenser for 3½ hours. An intense green coloration develops and a green solid gradually separates from the solution. After cooling, the green solid is filtered off, washed successively with a little aqueous pyridine and methylated spirits and dried.

The product is similar to that of Example 1.

Example 10

50 parts of 4-pyridylphthalonitrile, and 5 parts of triethanolamine are mixed and heated together at 180° C. After heating a few minutes an intense green color develops and a slight exothermic reaction occurs, the melt becoming thicker until after 1½ hours it is quite solid. The purple lustred product is powdered, extracted with ethanol and dried. It is soluble in concentrated sulphuric acid to give a yellowish brown solution and also in concentrated hydrochloric acid to give a yellow green solution. From these solutions it is thrown down as a bright green finely divided precipitate by adding water.

Example 11

5 parts of 4-pyridylphthalonitrile, 5 parts of formamide and 50 parts of benzophenone are mixed and heated under reflux for 6 hours. After heating for some time an intense green color develops. After cooling, the mixture is poured into 80 parts of ethanol, and the green precipitate is filtered off and washed with ethanol and dried. The product is similar to that of Example 10.

As many apparently widely different embodiments of this invention may be made without departing from the spirit and scope thereof, it is to be understood that we do not limit ourselves to the specific embodiments thereof except as defined in the appended claims.

In the claims below the term "phthalocyanines" when used in a generic sense shall be understood as referring to compounds which possess in their molecular structure the characteristic phthalocyanine configuration, namely the atomic arrangement expressed by the formula

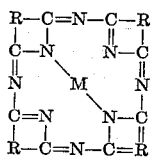

wherein R designates an ortho-arylene radical while M designates a bivalent cation selected from the group consisting of two hydrogen atoms, a divalent metal, and the bivalent radical of a trivalent metal.

The term "pyridyl" shall be understood as limited to a C-pyridyl radical, that is a pyridine molecule lacking the hydrogen atom on one of the carbon atoms, but shall be otherwise construed as generic to the alpha-pyridyl, beta-pyridyl and gamma-pyridyl radicals.

We claim:

1. Process for the manufacture of new phthalocyanines nuclearly substituted by pyridyl groups comprising interacting pyridylphthalonitriles with metal-yielding substances.

2. Process for the manufacture of new phthalocyanines nuclearly substituted by pyridyl groups comprising interacting pyridylphthalonitriles with a member of the group consisting of hydroxy compounds and acid amides.

3. Process for the manufacture of new phthalocyanines nuclearly substituted by pyridyl groups comprising interacting with urea and a metal-yielding substance, a member of the group consisting of pyridylphthalic acids, pyridylphthalic anhydrides and pyridylphthalimides.

4. As new compositions of matter phthalocyanines nuclearly substituted by pyridyl groups.

5. As a new composition of matter copper tetra-4-pyridylphthalocyanine.

6. As a new composition of matter metal-free tetra-4-pyridylphthalocyanine.

7. A process for the manufacture of phthalocyanine coloring matters containing pyridyl substituents in the aryl nuclei, which comprises subjecting to the phthalocyanine synthesis a compound selected from the group consisting of pyridyl-phthalonitrile and pyridyl-substituted ortho arylene compounds adapted to be converted into pyridyl phthalonitrile in situ under the conditions of the reaction.

8. A process for the manufacture of a tetra-pyridyl copper phthalocyanine, which comprises heating together a pyridyl-phthalonitrile and a copper yielding agent at a temperature sufficient to melt the pyridylphthalonitrile, and recovering the coloring matter thus produced.

9. A coloring compound of the general formula

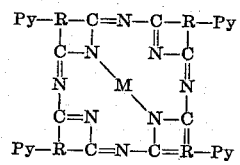

wherein Py designates a pyridyl radical, R designates an ortho-arylene radical, while M designates a bivalent cation selected from the group consisting of two hydrogen atoms, a divalent metal, and the bivalent radical of a trivalent metal monohalide.

10. A phthalocyanine coloring matter consisting essentially of a metal-phthalocyanine carrying pyridyl substituents in its arylene nuclei, the linkage in each case being from a carbon atom in the arylene nucleus to a carbon atom in the pyridine nucleus.

11. A phthalocyanine coloring matter consisting essentially of metal-free phthalocyanine carrying pyridyl substituents in its arylene nuclei, the linkage in each case being from a carbon atom in the arylene nucleus to a carbon atom in the pyridine nucleus.

ERIC FLOWER BRADBROOK.
ISIDOR MORRIS HEILBRON.
DONALD HOLROYDE HEY.
JOHN WYNNE HAWORTH.